Oct. 10, 1933.     H. D. GEYER     1,930,310
RESILIENT MOUNTING UNIT
Filed Dec. 6, 1929     2 Sheets-Sheet 2
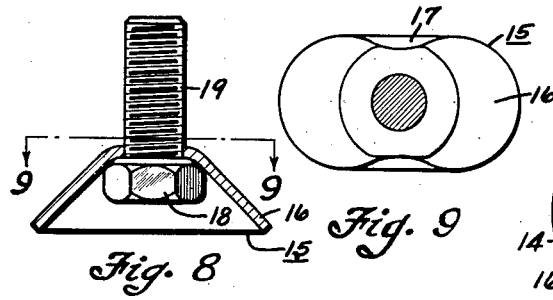
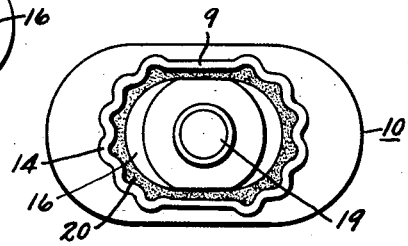
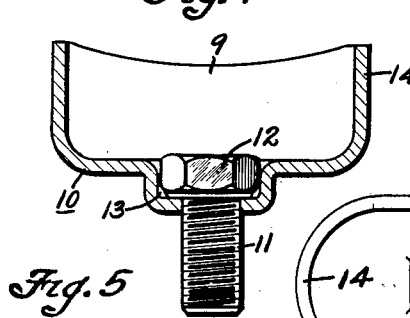
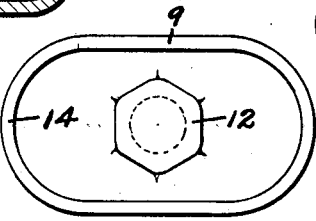
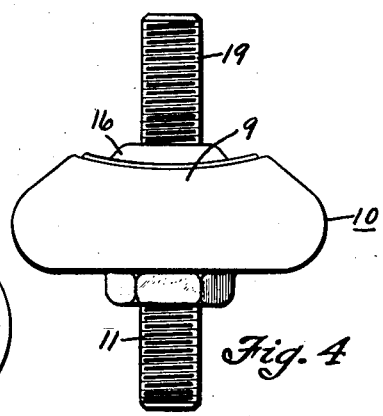
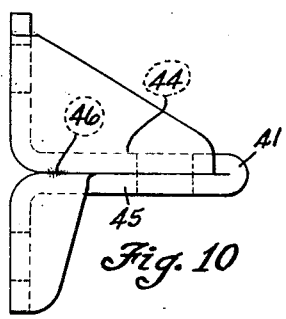
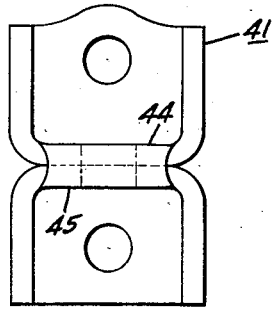
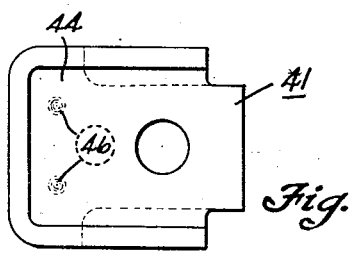
Inventor
Harvey D. Geyer
By Spencer Hardman & Fehr
His Attorneys Patented Oct. 10, 1933

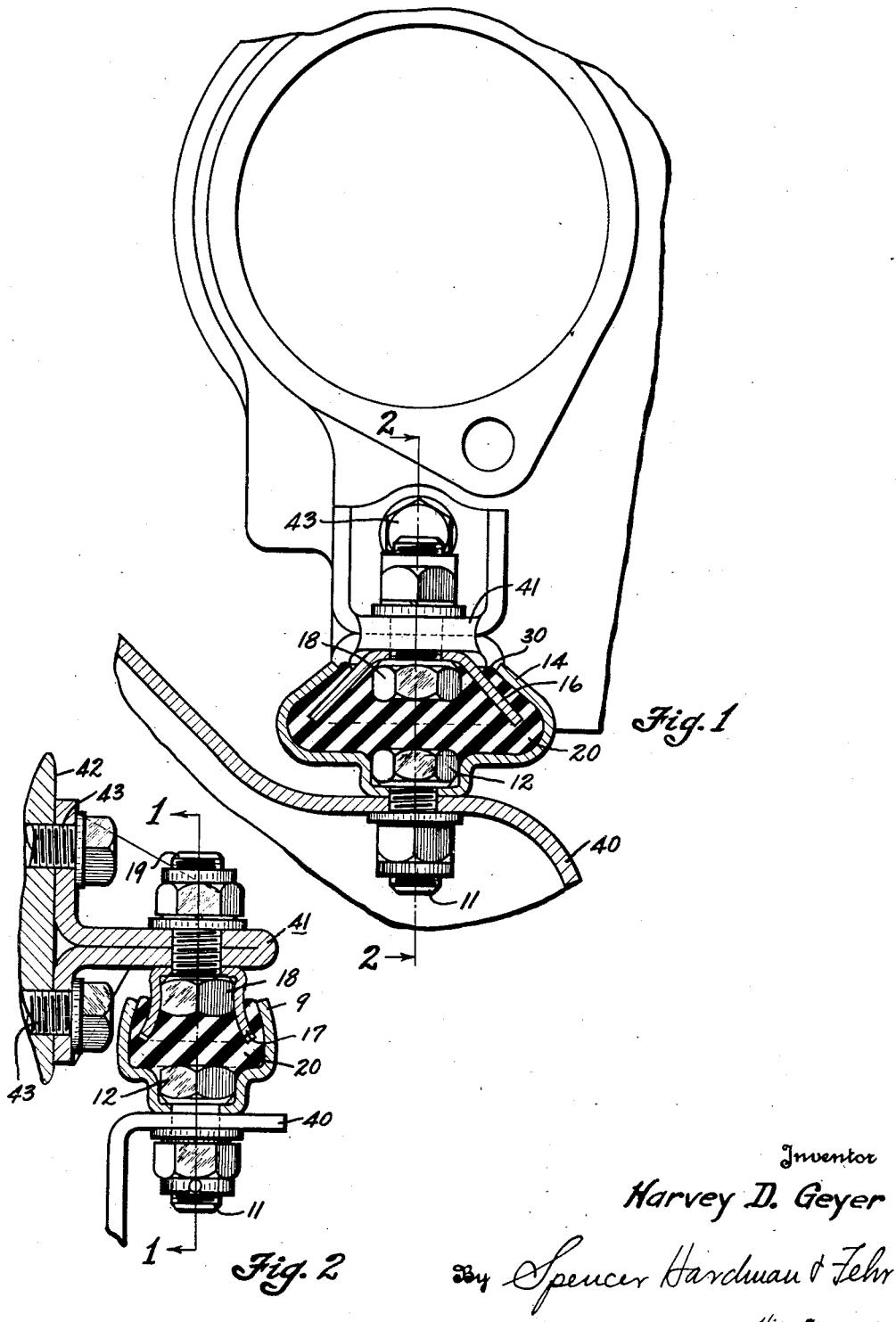

1,930,310

UNITED STATES PATENT OFFICE 1,930,310

RESILIENT MOUNTING UNIT

Harvey D. Geyer, Dayton, Ohio, assignor to The Inland Manufacturing Company, Dayton, Ohio, a corporation of Delaware Application December 6, 1929. Serial No. 412,130

1 Claim. (Cl. 248—14.2)

This invention relates to a universally yieldable, resilient mounting unit for connecting two metal parts whereby to break the metal connection between said connected parts and to dampen the transmission of vibrations.

In my copending application 266,938, filed April 3, 1928, (Patent 1,828,402, issued October 20, 1931) there is disclosed and claimed a similar resilient connector of circular form when viewed in plan. Improved features of this present invention are:

(1) In the elongated or oval form in plan of the exterior cup which is corrugated or otherwise bent inwardly to a substantial extent only at the end walls in order to provide a very secure overlapping interlock between the exterior cup and the interior bearing head.

(2) The corresponding elongated or oval form of the interior bearing head which has outwardly flaring end portions which underlie the crimped-in end walls of the exterior cup, but which has depending sides engaging the flat-sided head of the central bolt which serves as the attaching means.

(3) The general elongated form of the assembled mounting unit permits its use in narrow spaces or other cramped locations simply by turning its short dimension in the direction where the space is most limited.

(4) The general elongated form also provides a resilient mounting unit which is more rigid against relative movement in the direction of its long axis than in the direction of its short axis, which characteristic may be desirable in many cases.

Further objects and advantages of the present invention will be apparent from the following description, reference being had to the accompany drawings, wherein a preferred embodiment of one form of the present invention is clearly shown.

In the drawings:

Fig. 1 shows the resilient connector of this invention used as a Chevrolet automobile engine mount for connecting one side of the rear end of the engine upon a transverse member of the chassis frame. The mounting unit is shown in section on line 1—1 of Fig. 2.

Fig. 2 is a vertical section taken on line 2—2 of Fig. 1.

Figs. 3 and 4 are top and side views respectively of the completely assembled connector apart from the members connected thereby.

Figs. 5 to 9 show details of the connector prior to being assembled to form the connector shown in Figs. 3 and 4.

Fig. 5 is a vertical section through the exterior metal cup.

Fig. 6 is a plan view thereof prior to the side walls being deformed inwardly to compress and retain the resilient rubber block.

Fig. 7 is a vertical section through the resilient rubber block as moulded and prior to its deformation.

Fig. 8 is a vertical section through the interior bearing head.

Fig. 9 is a plan view thereof.

Figs. 10, 11 and 12 are side, top and end elevations respectively of the pressed metal bracket used to attach the resilient connector to the engine.

Similar reference characters refer to similar parts throughout the various views.

Numeral 10 marks the exterior elongated presed metal cup first pressed to the shape shown in Figs. 5 and 6. 11 is the hexagon headed bolt whose head 12 fits within a corresponding recess 13 in cup 10 to prevent relative turning of the bolt head. 15 marks the interior elongated pressed metal bearing head pressed to the shape shown in Figs. 8 and 9. The end portions 16 of the bearing head flare outwardly while the side portions 17 are turned down to engage the opposite flat sides of the hexagon head 18 of bolt 19 and thereby prevent relative rotation of bolt 19 (see Fig. 2).

The resilient rubber block 20 is preferably molded to the shape shown in Fig. 7 and with the continuous slot 21 molded therein to receive the head 15. Block 20 is easily snapped upon the flared ends 16 of the head 15 by distorting the resilient rubber. The block 20 with the head 15 inserted therein is then set within the outer cup 10, the two bolts 11 and 19 being of course first inserted in place. By means of suitable dies the outer cup 10 has its walls pressed inwardly upon the resilient block 20 to highly compress and materially distort the same and to permanently fix the bearing head 15 and cup 10 together in isolated relation. It is to be noted that the side walls 9 of cup 10 are turned or bent inwardly only a small amount (see Fig. 2), while the end walls 14 are bent inwardly a very substantial amount so that they overlie the flared end portions 16 of the interior head 15 and are firmly interlocked therewith (see Fig. 1). It will now be clear that with the elongated exterior cup and the corresponding shaped inner head, the long sides 9 of the exterior cup may by suitable dies be very easily bent inwardly without any corrugations, while the relatively short end portions 14 are materially corrugated to provide for the required amount of closing in of the cup walls (see Fig. 3). It is obvious that the elongated shape of the outer cup 10 requires less corrugating for a given amount of closing in of the cup periphery than is the case with circular cups, such as disclosed in my above mentioned copending application. The distortion or flow of the resilient rubber due to its compression by the closing in of the outer cup causes the rubber to completely fill all the crevices about the bolt heads 12 and 18 and also to flow or bulge outwardly in the narrow space 30 between the overlapping portions of the outer cup 10 and inner cup 15 (see Figs. 2 and 3).

In operation, the connector has the outer cup rigidly clamped by bolt 11 to the chassis frame member 40 and the inner cup or bearing head 15 to the bracket 41 which is rigidly fixed to a vertical surface 42 of the engine by bolts or screws 43. It will be clear that the engine is isolated from the frame member 40 by the resilient rubber 20 and yet they will be very securely attached together by a universally resilient connector. Sound and other vibrations will thus be damped or be entirely prevented from passing from the engine to the chassis frame.

The bracket 41 is shown in detail in Figs. 10, 11 and 12 and is clearly shown as a one-piece stamping which may be made from deep drawing cold rolled steel. Preferably the two contacting horizontal portions 44 and 45 are spot-welded together at points 46 opposite the bend where these portions are integral. Such welding provides rigidity to the bracket prior to its attachment to the engine by bolts 43, as will be clear from the drawings.

While the form of embodiment of the present invention as herein disclosed, constitutes a preferred form, it is to be understood that other forms might be adapted, all coming within the scope of the claim which follows.

What is claimed is as follows:

A universally yieldable metal-isolating mounting unit for connecting two members comprising: an elongated pressed metal exterior cup adapted to be fixed to the lower member, a correspondingly elongated metal head inserted within said cup and adapted to be fixed to the upper connected member, said elongated head comprising a pressed metal cup having a central aperture and a bolt having a flat-sided head engaging the bottom of said cup and its shank extending through said aperture, said elongated cup having depending lateral portions engaging said flat-sided bolt head to prevent relative turning and downwardly flared end portions, and a resilient rubber block isolating said head and exterior cup and held under high compression by an inward closing in of said exterior cup so that its end portions overlie and interlock with said downwardly flared end portions of said interior head.

HARVEY D. GEYER.